S. JOHNSON.
Corn-Planter.
No. 31,354.
Patented Feb. 5, 1861.
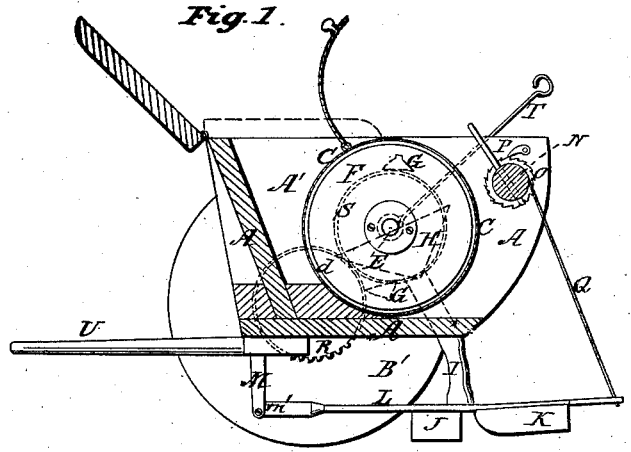
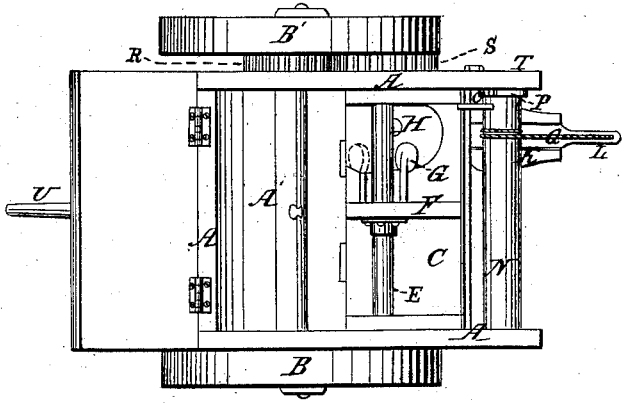

UNITED STATES PATENT OFFICE.

STEPHEN JOHNSON, OF COLD SPRING, ASSIGNOR TO HIMSELF AND LYMAN E. DAMAN, OF NAPOLI, NEW YORK.

IMPROVEMENT IN SEED-PLANTERS.

Specification forming part of Letters Patent No. 31,354, dated February 5, 1861.

*To all whom it may concern:*

Be it known that I, STEPHEN JOHNSON, of Cold Spring, Cattaraugus county, and State of New York, (assignor to myself and LYMAN E. DAMAN, of Napoli, in said county,) have invented certain new and useful Improvements in Seed-Planters; and I do hereby declare that the following is a full, clear, and exact description of the construction and operation of the same, reference being had to the accompanying drawings, making a part of this specification, in which—

Figure I is a longitudinal section of my improved machine. Fig. II is a plan of the same. Fig. III is a plan of the under side of the plow and coverer.

Like letters refer to like parts in each of the figures.

A represents the main frame-work of the machine, which is supported upon the carrying-wheels B B', and to which the other parts of the machine are connected. It is so constructed as to form a seed-box, A', for holding and carrying the seed to be planted.

C is a hollow cylinder, lying transversely between the side pieces of the seed-box, and forms the rear end piece to the seed-box.

d is a small opening in the cylinder, which opens into the seed-box to allow the seed to pass from the seed-box into the cylinder, to be thence taken and carried into the hopper, as hereinafter described.

E is a horizontal shaft, placed in the center of the cylinder C, having bearings in the side pieces of the seed-box. Upon this shaft is supported a circular disk, F, its periphery revolving close to the inner surface of the cylinder. This disk has one or more seed-cups, G, which project at right angles therefrom near its periphery, and which revolve with the disk.

H represents a hopper, which is placed within the cylinder for the purpose of receiving the seeds as they are dropped from the cups G, and, in connection with a flexible tube, I, conducting them to the furrow opened by the plow.

J is a double-shared plow, which opens a furrow right and left, the seed being dropped into the furrow thus opened between the two shares. This plow is made fast to the hinged bar or lever L.

K is a coverer, which consists of two wings dropping down from the lever L in rear of the plow J. These wings have an outward flare at the front end, so as to gather in the earth from both sides, which is thrown out by the plow J, the rear ends thereof being so near together as to throw the earth in and cover up the seeds which have been dropped into the furrow formed by the plow J.

The lever L is hinged to the hangers M, as shown at m'.

N represents a windlass-shaft, having ratchet-wheel O, pawl P, and rope Q for the purpose of raising the plow and coverer, as may be required for conveying the machine from place to place.

R is a spur-wheel, connected with the driving-wheel B'; S, spur-wheel on shaft E, gearing with the spur-wheel R, and giving motion to the shaft E and disk F. This wheel may be thrown in or out of gear with the wheel R by the lever T or any other ordinary means.

U is a draft-pole.

The driver can ride on the cover of the seed-box.

Operation: The seed from the seed-box runs into the cylinder C through the passage d. The cups as they revolve will pick up a certain number of seeds from the bottom of the cylinder, according to their size, and as they become inverted in the course of their revolution they will drop the seed into the hopper H, from whence it will be conducted through the flexible tube I into the furrow formed by the plow J, the furrow being closed and the seed covered by the coverer K. The number of seeds in the hill and the distance apart of the hills are regulated, the first by the size of the cups, (of which there may be several sizes for different kinds of seeds,) which should be made to hold just the number of seeds desired in each hill, the second by the number of cups on the disk F, it being evident that the less the number of cups the farther apart the hills will be, and vice versa.

I claim—

The described arrangement of the cups G, disk F, and hopper H within the cylinder C, the same being arranged and used in connection with the plow J and coverer K, which are supported by the hinged lever-bar L, with flexible tube I, the whole arranged and operating as set forth.

STEPHEN JOHNSON.

Witnesses:
ELIAS BUSHNELL,
CHARLES E. BARBER.